US012482984B2

(12) United States Patent
Urashima et al.

(10) Patent No.: US 12,482,984 B2

(45) Date of Patent: Nov. 25, 2025

(54) CONNECTOR ASSEMBLY, WIRE HARNESS, AND CONNECTOR COVER

(71) Applicant: YAZAKI CORPORATION, Tokyo (JP)

(72) Inventors: Tomohiro Urashima, Tochigi (JP); Hiroyasu Furuya, Tochigi (JP); Yu Sugawara, Tochigi (JP)

(73) Assignee: YAZAKI CORPORATION, Tokyo (JP)

( * ) Notice: Subject to any disclaimer, the term of this patent is extended or adjusted under 35 U.S.C. 154(b) by 389 days.

(21) Appl. No.: 18/170,198

(22) Filed: Feb. 16, 2023

(65) Prior Publication Data

US 2023/0268683 A1 Aug. 24, 2023

(30) Foreign Application Priority Data

Feb. 18, 2022 (JP) ................................ 2022-024061

(51) Int. Cl.
*H01R 13/62* (2006.01)
*H01R 13/627* (2006.01)

(52) U.S. Cl.
CPC ................................ *H01R 13/6272* (2013.01)

(58) Field of Classification Search
None
See application file for complete search history.

(56) References Cited

U.S. PATENT DOCUMENTS 9,634,429 B2 * 4/2017 Chen ...................... H01R 24/20
2023/0216245 A1 7/2023 Matsuoka et al.

FOREIGN PATENT DOCUMENTS

JP 2003-257543 A 9/2003
JP 2021-168264 A 10/2021
JP 2021-197355 A 12/2021

* cited by examiner

*Primary Examiner* — Ross N Gushi
(74) *Attorney, Agent, or Firm* — Sughrue Mion, PLLC

(57) ABSTRACT

A connector assembly applied to a wire harness includes a connector and a connector cover that is attached to the connector. Furthermore, the connector cover includes: a wall part that forms a connector housing space part for housing an end part of the connector and a locking release part, and a routing space part which is positioned adjacent to the connector housing space part and in which a wiring material is routed; a hole part that is formed in the wall part, while being positioned adjacent to the locking release part and communicating inside and outside of the connector housing space part in a state of being attached to the connector; and a restriction part that is formed in the wall part and blocks the hole part from the routing space part in a state of being attached to the connector.

18 Claims, 9 Drawing Sheets

CONNECTOR ASSEMBLY, WIRE HARNESS, AND CONNECTOR COVER

CROSS-REFERENCE TO RELATED APPLICATION(S)

The present application claims priority to and incorporates by reference the entire contents of Japanese Patent Application No. 2022-024061 filed in Japan on Feb. 18, 2022.

BACKGROUND OF THE INVENTION

1. Field of the Invention

The present invention relates to a connector assembly, a wire harness, and a connector cover.

2. Description of the Related Art

A protection cover for connector is known as a component that is loaded on a vehicle such as an automobile and houses a connector mounted to an end of a wire harness so as to protect the connector. For example, a protective cover described in Japanese Patent Application Laid-open No. 2003-257543 is configured with a first half part and a second half part of the same shape that can be divided into two halves, each of which has a groove part formed in a rear-end inner wall for securing an end part of a corrugated tube.

By the way, such a protection cover described above (hereinafter, referred to as a connector cover) may sometimes be designed in a shape that covers a rear end part (base end part) of a connector disposed by being protruded from a connection mating member, in order to improve the protection performance for the connector. In such a case, it is difficult to access a connection part of the connector from outside, which complicates wiring connection and removal work and may deteriorate work efficiency, for example. Therefore, there is room for further improvement while ensuring proper protection performance.

SUMMARY OF THE INVENTION

The present invention has been made in view of the above, and an object is to provide a connector assembly, a wire harness, and a connector cover capable of ensuring proper protection performance.

In order to achieve the above mentioned object, a connector assembly according to one aspect of the present invention includes a connector including a housing that includes a terminal housing part for housing a terminal provided at an end part of a wiring material exhibiting conductivity, an insertion port where the wiring material is inserted, a locking part formed on an outer face side of the terminal housing part and capable of locking a connection mating member, and a locking release part formed on the outer face side and capable of releasing a locking relation with the connection mating member; and a connector cover attached to the connector, wherein the connector cover includes a wall part that forms a connector housing space part for housing an end part of the connector on the insertion port side and the locking release part, and a routing space part where the wiring material is routed, the routing space part being positioned adjacent to the connector housing space part, a hole part formed in the wall part, the hole part being positioned adjacent to the locking release part and communicating inside and outside of the connector housing space part in a state of being attached to the connector, and a restriction part formed in the wall part and blocks the hole part from the routing space part in a state of being attached to the connector.

A wire harness according to another aspect of the present invention includes a wiring material with terminal including a wiring material exhibiting conductivity and a terminal provided at an end part of the wiring material; a connector including a housing that includes a terminal housing part for housing the terminal, an insertion port where the wiring material is inserted, a locking part formed on an outer face side of the terminal housing part and capable of locking a connection mating member, and a locking release part formed on the outer face side and capable of releasing a locking relation with the connection mating member; and a connector cover attached to the connector, wherein the connector cover includes a wall part that forms a connector housing space part for housing an end part of the connector on the insertion port side and the locking release part, and a routing space part where the wiring material is routed, the routing space part being positioned adjacent to the connector housing space part, a hole part formed in the wall part, the hole part being positioned adjacent to the locking release part and communicating inside and outside of the connector housing space part in a state of being attached to the connector, and a restriction part formed in the wall part and blocks the hole part from the routing space part in a state of being attached to the connector.

A connector cover according to still another aspect of the present invention includes a wall part that forms a connector housing space part for housing an end part of a connector on an insertion port side and a locking release part, and a routing space part where a wiring material is routed, the routing space part being positioned adjacent to the connector housing space part, the connector including a housing that includes a terminal housing part for housing a terminal provided at an end part of the wiring material exhibiting conductivity, the insertion port where the wiring material is inserted, a locking part formed on an outer face side of the terminal housing part and capable of locking a connection mating member, and a locking release part formed on the outer face side and capable of releasing a locking relation with the connection mating member; a hole part that is formed in the wall part, the hole part being positioned adjacent to the locking release part and communicating inside and outside of the connector housing space part in a state of being attached to the connector; and a restriction part that is formed in the wall part and blocks the hole part from the routing space part in a state of being attached to the connector.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Figure 1:
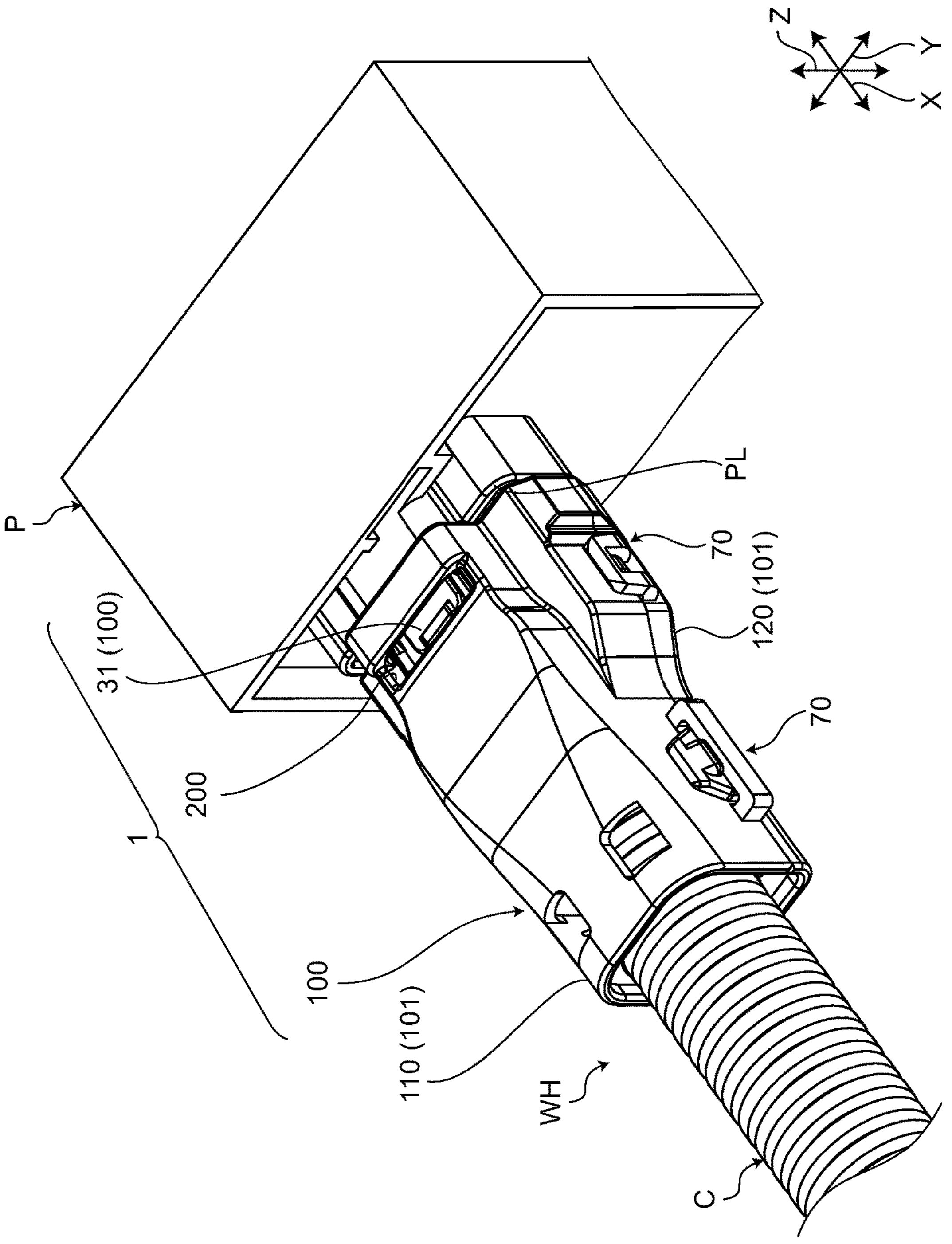
FIG. 1 is a perspective view illustrating a schematic configuration of a wire harness including a connector assembly according to an embodiment, which is a diagram illustrating a state where a connector and a connection mating member are connected.

Hereinafter, an embodiment according to the present invention will be described in detail with reference to the accompanying drawings. Note, however, that the present invention is not limited by the embodiment. Furthermore, structural components in the following embodiment include those that can be easily replaced by those skilled in the art, or those that are substantially the same.

Embodiment

A wire harness WH illustrated in FIG. 1 to FIG. 6 is, for example, configured to connect a wiring material W used for power supply and signal communication to each device via a connector 10 for connecting each of the devices loaded on a vehicle.

The wire harness WH includes: a wiring material WT with terminal that includes the wiring material W exhibiting conductivity and a terminal T provided at an end of the wiring material W (see FIG. 6); a corrugated tube C as a sheathing material into which the wiring material W is inserted; and a connector assembly 1. Note that the wire harness WH may be configured without the sheathing material. In addition, the wire harness WH may further include a grommet, a fixture, and the like.

The wiring material W is, for example, an insulated electric wire with the core wire, which is a bundle of a plurality of conductive metal element wires, covered with an insulation coating part. Note that the wiring material W may be an insulated metal rod, which is a conductive metal rod covered with an insulation coating part.

The terminal T is, for example, a crimp terminal configured with a conductive metallic material. For example, the terminal T is formed into a prescribed shape by performing pressing such as bending and cutting on a metal plate that is a base material. The terminal T provided at the end part of the wiring material W is housed in the connector 10 and connected to a mating connector P as a connection mating member of the connector 10 provided in each device, thereby electrically connecting each of the devices. The terminal T includes: a terminal side connection part that is physically and electrically connected to a tab-shaped terminal PT of the mating connector P (see FIG. 6); and a wiring material side connection part that is physically and electrically connected to the wiring material W. Note that the terminal side connection part and the wiring material side connection part of the wiring material WT with terminal are the parts that configure what is called a live part WE (see FIG. 3 and FIG. 6) in the connector 10.

The corrugated tube C is formed into a flexible tubular shape with an insulating resin material, for example, and protects the wiring material W inserted therein. The corrugated tube C has annular recessed and protruded parts Ca formed along the circumferential direction of an outer surface, and a bellows shape is formed with a plurality of the recessed and protruded parts Ca provided along an extending direction (axial direction X to be described later) (see FIG. 6). Note that the corrugated tube C may have a slit formed along the extending direction for inserting the wiring material W therein. While the corrugated tube C is described as an example of the sheathing material in the present embodiment, the type of sheathing material is not specifically limited. The sheathing material may also be a metal pipe formed with a metallic material, for example.

The connector assembly 1 includes the connector 10 and a connector cover 100 that is attached to the connector 10. The connector 10 can be electrically connected to the mating connector P by being connected to the mating connector P. On the other hand, the connector cover 100, while being attached to the connector 10, houses the base end part of the connector 10, the wiring material WT with terminal extended from the connector 10, and a locking release part 31 capable of releasing the locking relation between the connector 10 and the mating connector P, thereby making it possible to protect the connector 10, the wiring material WT with terminal, the live part WE, and the like while preventing the connected state of the connector 10 and the mating connector P from being released by an unintentional operation. Furthermore, the connector cover 100 has a hole part 200 that allows access to the locking release part 31 from the outside while being attached to the connector 10, which achieves a configuration capable of improving the work efficiency while ensuring the proper protection performance. Hereinafter, configurations of each of the connector 10 and the connector cover 100 configuring the connector assembly 1 will be described in detail by referring to FIG. 1 to FIG. 8.

In the description hereinafter, in regards to a first direction, a second direction, and a third direction intersecting with each other, the first direction is referred to as an “axial direction X”, the second direction as a “width direction Y”, and the third direction as a “height direction Z”. The axial direction X, the width direction Y, and the height direction Z are orthogonal to each other. The axial direction X is typically the extending direction of the wiring material W held in the corrugated tube C, which corresponds to the extending direction of the terminal T of the wiring material WT with terminal housed in the connector 10, the attachment/detachment directions of the connector 10 to/from the mating connector P, the depth direction of the connector cover 100, and the like. Furthermore, the height direction Z typically corresponds to the direction orthogonal to a face (a fourth wall part 100*d*) where the connector 10 is installed, among the faces configuring the connector cover 100, and the like. Unless otherwise noted, each of the directions used in the following description will be described as the direction in a state where the connector cover 100 is mounted to the connector 10 into which the terminal T of the wiring material WT with terminal is inserted.

Furthermore, the tip side in the axial direction X is typically the side where the terminal T is positioned in the wiring material WT with terminal, and it corresponds to the side of the connector 10 connected to the mating connector P, and the like. Moreover, the base end side in the axial direction X corresponds to the side where the wiring material W drawn from a housing 11 is positioned in the wiring material WT with terminal, and the like. Furthermore, the upper side in the height direction Z corresponds to the side of the space where the locking release part 31 configuring the housing 11 of the connector 10 is housed in an internal space S of the connector cover 100, the side where the hole part 200 is positioned in a wall part 100K of the connector cover 100, and the like.

Connector 10

The connector 10 is configured including the housing 11 that is formed, for example, with an insulating resin material or the like.

Figure 3:
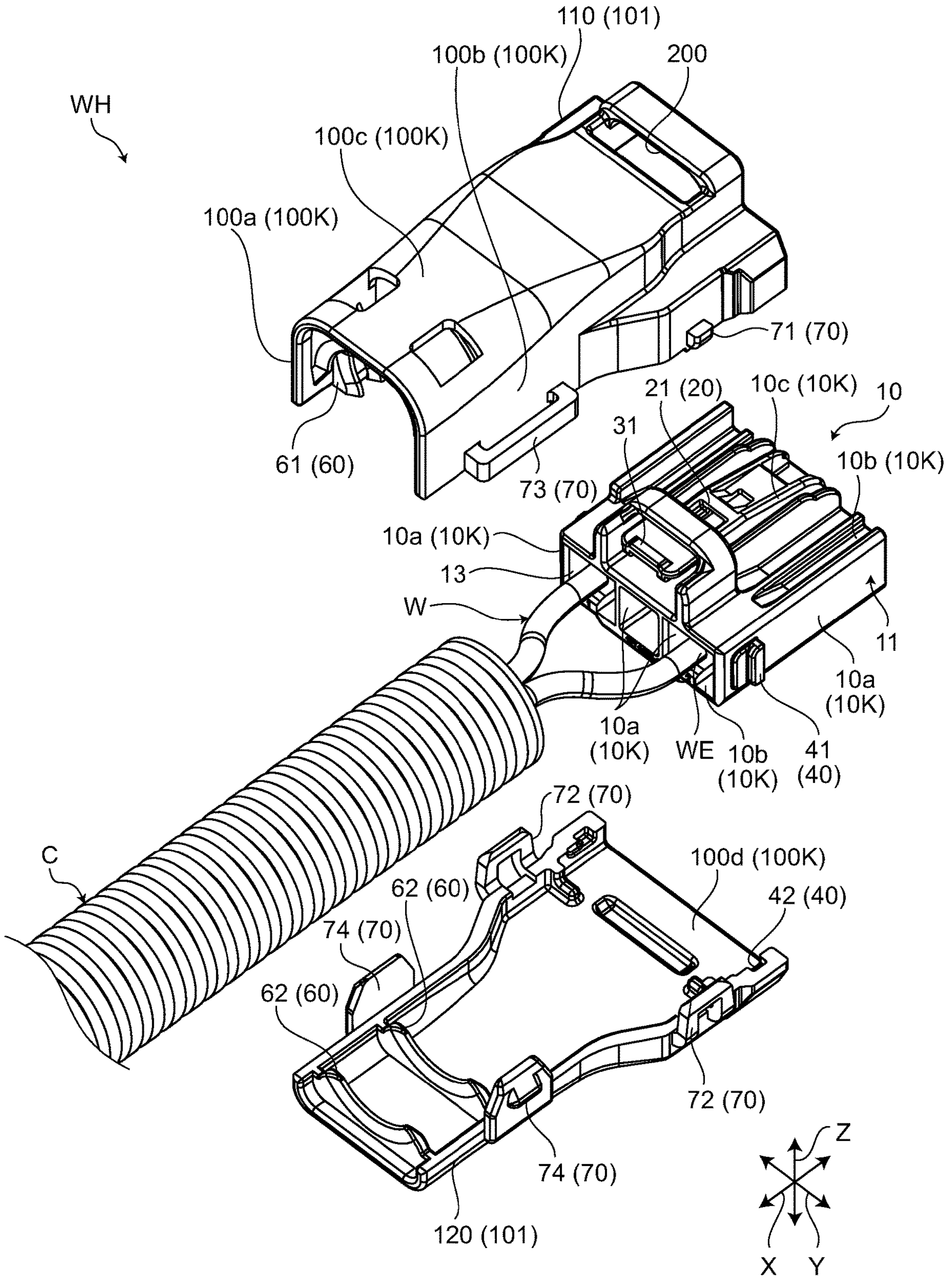
FIG. 3 is an exploded perspective view illustrating a schematic configuration of the wire harness including the connector assembly according to the embodiment.

As illustrated in FIG. 3, the housing 11 is configured with a wall part 10K and has a plurality of terminal housing parts 12 for housing the terminals T and insertion ports 13 which are provided correspondingly to the respective terminal housing parts 12 and through which the wiring materials W are inserted.

The terminal housing part 12 is formed in a substantially rectangular cylindrical shape as a whole with both end parts in the axial direction X being opened, which is formed as a unit by a pair of first wall parts 10*a* and a pair of second wall parts 10*b* configuring the wall part 10K.

Each of the first wall parts 10*a* is a sidewall part with the width direction Y being the thickness direction, which is formed into a substantially rectangular plate shape, and positioned by opposing to each other with a space provided therebetween along the width direction Y. On the other hand, each of the second wall parts 10*b* is a top wall part or a bottom wall part with the height direction Z being the thickness direction, which is formed into a substantially rectangular plate shape, and positioned by opposing to each other with a space provided therebetween along the height direction Z. Note that the first wall part 10*a* and the second wall part 10*b* are formed to have almost equivalent lengths along the axial direction X.

Furthermore, two terminal housing parts 12 are disposed in the housing 11, and each of the terminal housing parts 12 is positioned along the width direction Y with a space provided therebetween. The terminal housing part 12 has a lance 12*a* that locks the terminal T housed inside. The number of terminal housing parts 12 disposed in the housing 11 is determined in accordance with the number of terminals T of the wiring material WT with terminal.

The insertion port 13 is an opening formed at the end part on the base end side of each of the terminal housing parts 12 in the axial direction X, and it is a part from which the wiring material W extending from the terminal T of the wiring material WT with terminal is inserted when the terminal T is inserted into the terminal housing part 12.

Furthermore, when connected to the mating connector P, the housing 11 locks the mating connector P at a locking position L1 via a locking mechanism 20.

Figure 6:
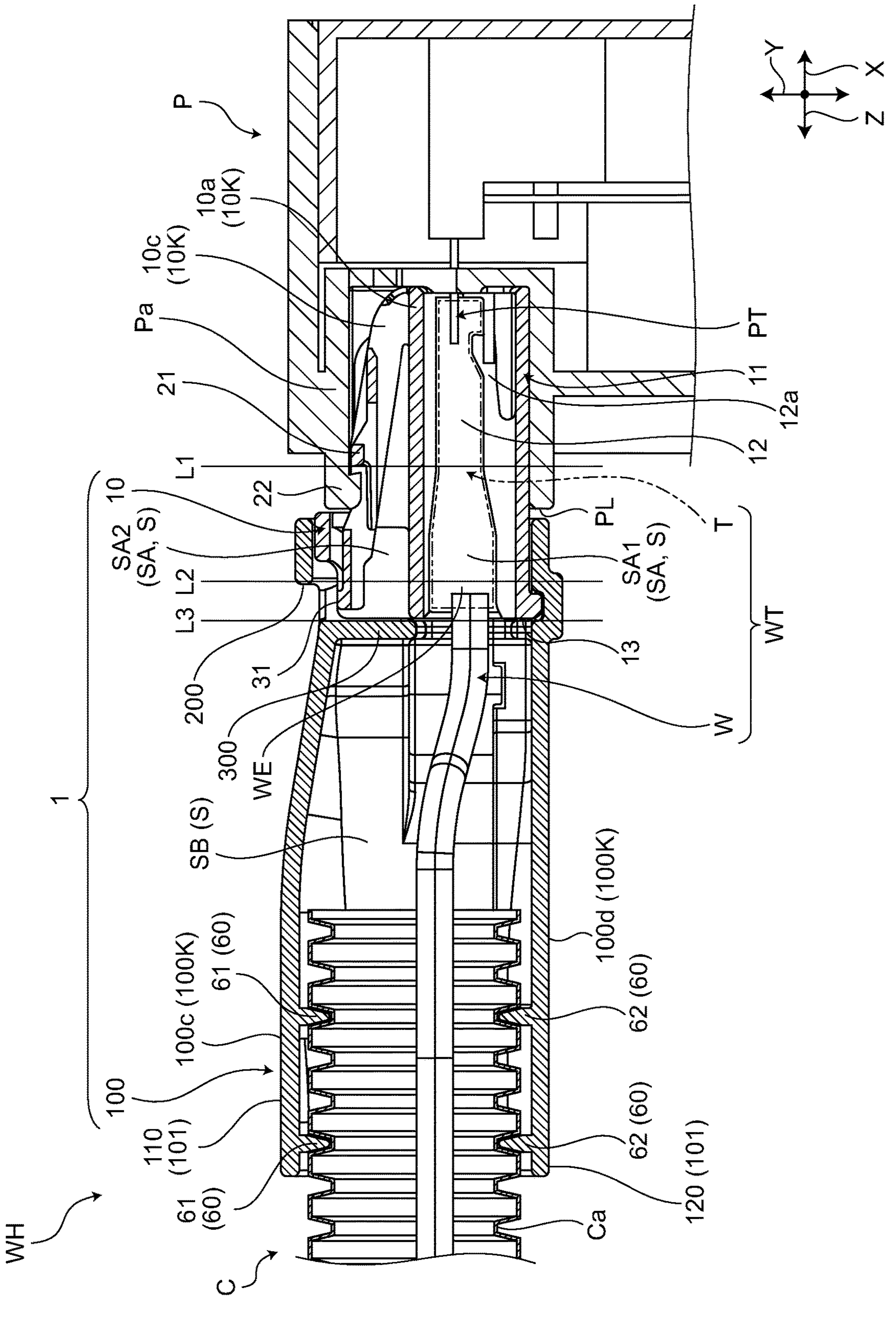
FIG. 6 is a cross-sectional side view of the wire harness including the connector assembly according to the embodiment taken along the axial direction thereof, which is a diagram for describing a hole part formed in a wall part of the connector cover, and a restriction part.

As illustrated in FIG. 3 and FIG. 6, the locking mechanism 20 is capable of locking the mating connector P, and it is configured including a locking part 21 that is provided correspondingly to a locked part 22 provided in the mating connector P.

The locking part 21 is provided on an arm part 10*c* formed in the wall part 10K. The arm part 10*c* is formed on the outer face side of the second wall part 10*b* positioned on the upper side in the height direction Z out of the pair of second wall parts 10*b*, and it extends in a cantilever-like shape from the second wall part 10*b* along the axial direction X that corresponds to the attachment-detachment directions of the connector 10 so as to be configured to be elastically deformable along the height direction Z that intersects with the axial direction X.

The locking part 21 has a hole part into which a protruded part formed as the locked part 22 is inserted, and the hole is opened along the height direction Z. On the other hand, the locked part 22 is formed on a wall part Pa of the mating connector P. The wall part Pa herein is the wall part that is positioned by opposing to an outer face of the first wall part 10*a* with a space provided therebetween while the connector 10 is being fitted. The locked part 22 is formed in a claw-like shape by protruding downward (inwardly) in the height direction Z from the inner face side of the wall part Pa.

Furthermore, the housing 11, when removed from the mating connector P, releases the locking state with the mating connector P via a locking release mechanism 30.

Figure 2:
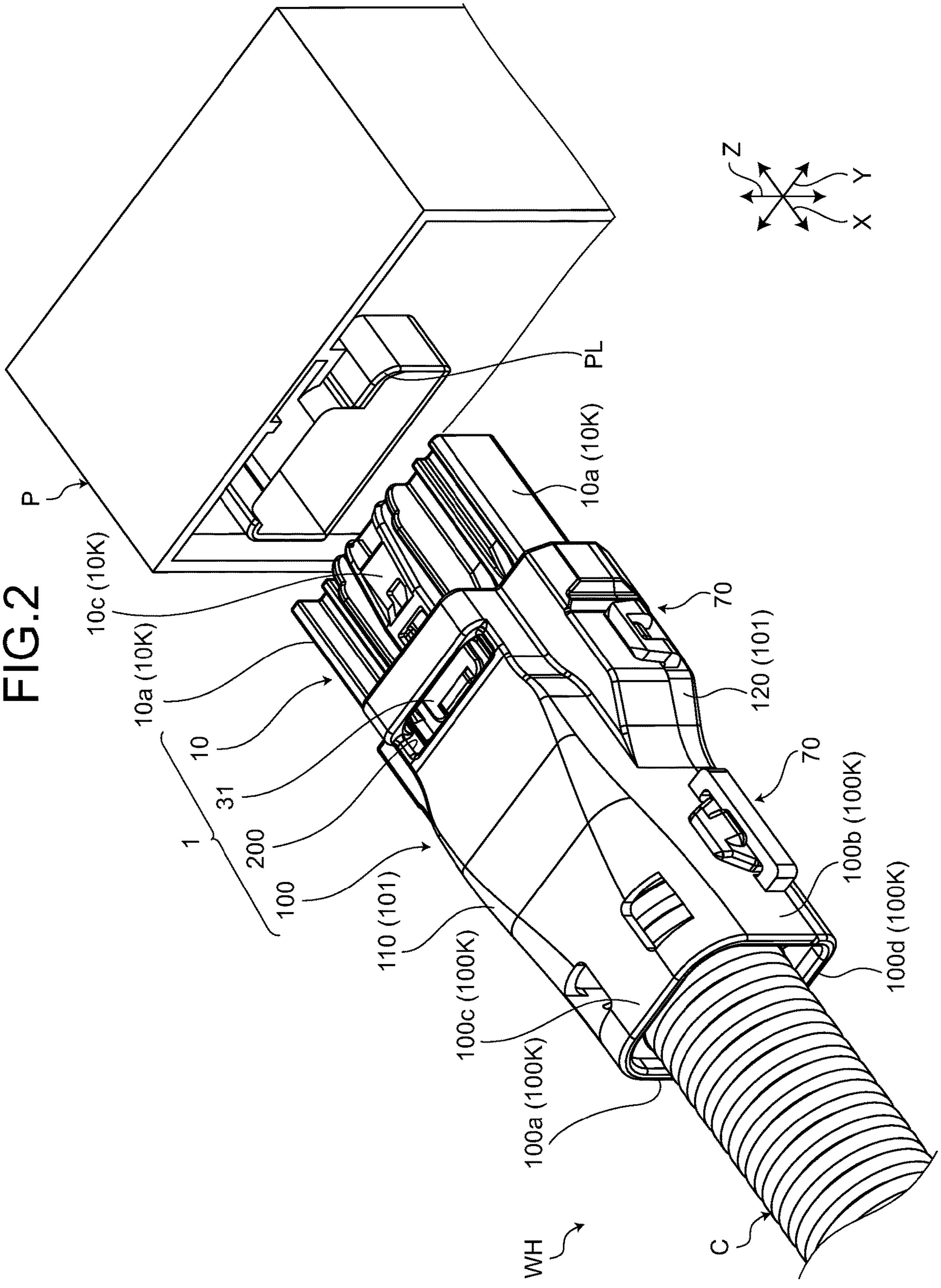
FIG. 2 is a perspective view illustrating a schematic configuration of the wire harness including the connector assembly according to the embodiment, which is a diagram illustrating a state before the connector is connected to the connection mating member.

As illustrated in FIG. 2 and FIG. 6, the locking release mechanism 30 is configured including the locking release part 31 provided on the arm part 10*c*.

The locking release part 31 is formed at the tip part of the arm part 10*c* (the end part on the base end side of the arm part 10*c* in the axial direction X), and elastically deforms the entire arm part 10*c* inwardly when an external force is applied. Furthermore, the locking release part 31 is formed at least partially protruding upward (outwardly) in the height direction Z from the outer face side of the arm part 10*c*.

Connector Cover 100

The connector cover 100 is configured including a main body part 101 that is formed, for example, with an insulating resin material or the like.

The main body part 101 is formed with the integrated wall part 100K as a unit, and formed into a cylindrical shape as a whole with both end parts in the axial direction X being opened. Furthermore, the main body part 101 has a connector housing space part SA and a routing space part SB as the internal space S configured with the wall part 100K. The connector housing space part SA is a space part in the internal space S, which houses the end part of the connector 10 on the insertion port 13 side and the locking release part 31. On the other hand, the routing space part SB is positioned adjacent to the connector housing space part SA in the internal space S, and it is a space where the wiring material W is routed. Furthermore, as illustrated in FIG. 6, the connector housing space part SA has a first space part SA1 and a second space part SA2. The first space part SA1 is positioned on the lower side of the connector housing space part SA in the height direction Z, and it is a space part that houses the end part of the connector 10 on the insertion port 13 side. On the other hand, the second space part SA2 is positioned on the upper side of the connector housing space part SA in the height direction Z, and it is a space part that houses the locking release part 31.

The connector housing space part SA and the routing space part SB are the space parts formed by the wall parts that are a first wall part 100*a*, a second wall part 100*b*, a third wall part 100*c*, and a fourth wall part 100*d* configuring the wall part 100K.

The first wall part 100*a* and the second wall part 100*b* are sidewall parts whose width direction Y is the thickness direction, which extend along the axial direction X and the height direction Z, and are positioned opposing to each other with a space provided therebetween along the width direction Y. On the other hand, the third wall part 100*c* and the fourth wall part 100*d* are a top wall part or a bottom wall part with the height direction Z being the thickness direction, which extend along the axial direction X and the width direction Y, and are positioned by opposing to each other with a space provided therebetween along the height direction Z. Note that the shapes of the first wall part 100*a* and the second wall part 100*b* are formed to be almost symmetrical with the internal space S interposed therebetween. Similarly, the shapes of the third wall part 100*c* and the fourth wall part 100*d* are formed to be almost symmetrical with the internal space S interposed therebetween.

Note that the main body part 101 according to the present embodiment is configured including a first cover 110 and a second cover 120, as illustrated in FIG. 1 to FIG. 3. In other words, the main body part 101 according to the present embodiment is configured by a split structure with the first cover 110 and the second cover 120. The first cover 110 and the second cover 120 are mounted by sandwiching the end part of the connector 10 on the insertion port 13 side and the end part of the corrugated tube C that houses the wiring material W extending from the insertion port 13. Therefore, the first cover 110 is formed by the upper portions in the height direction Z of the first wall part 100*a* and the second wall part 100*b* as the sidewall parts, and the third wall part 100*c* as the top wall part. Furthermore, the second cover 120 is formed by the lower portions in the height direction Z of the first wall part 100*a* and the second wall part 100*b* as the sidewall parts, and the fourth wall part 100*d* as the bottom wall part wall part.

Figure 7:
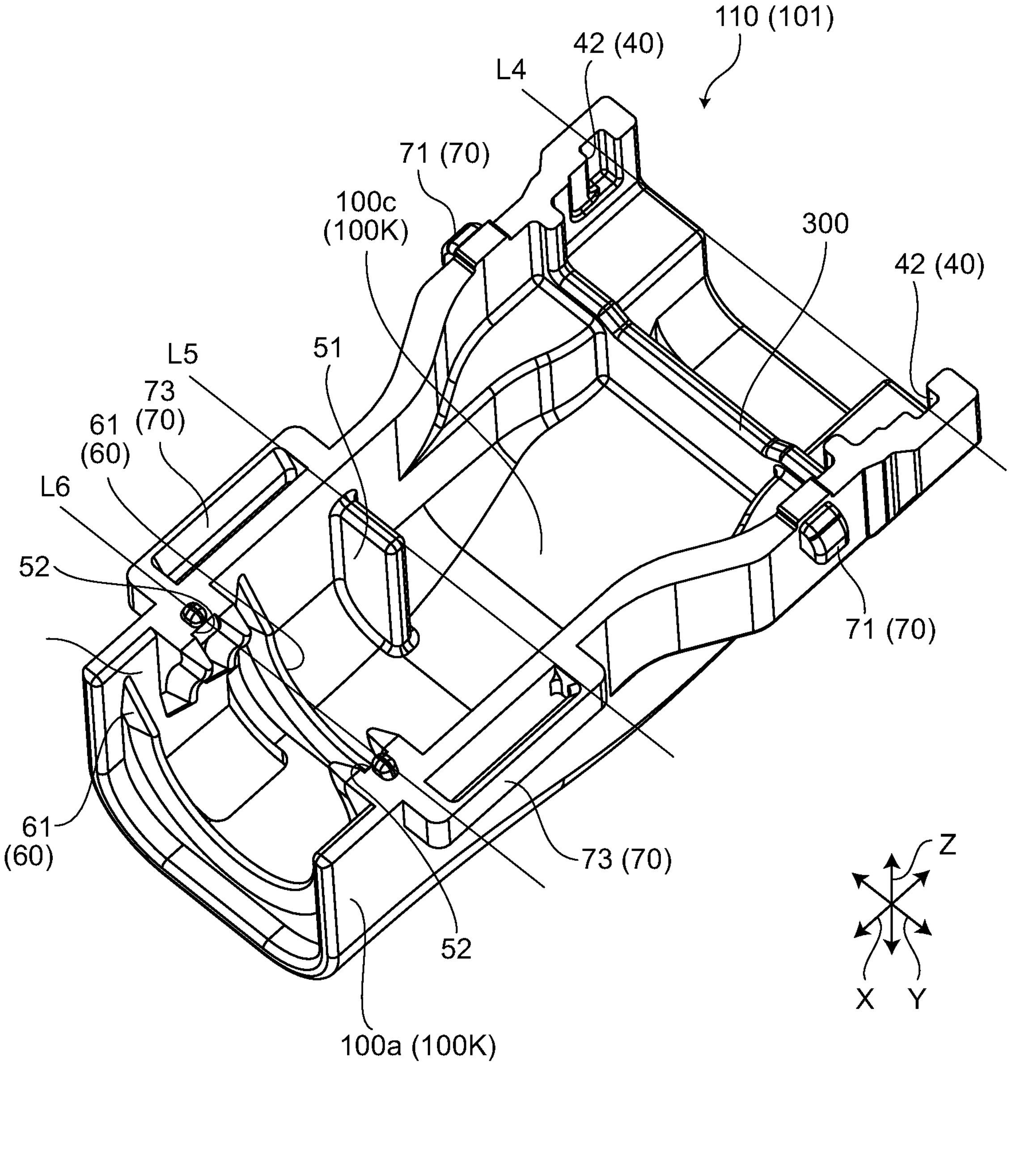
FIG. 7 is a perspective view of a first cover of the connector cover according to the embodiment.

As illustrated in FIG. 3, FIG. 6, FIG. 7, and the like, the first cover 110 includes: the hole part 200 that is formed in the third wall part 100*c* and communicates the inside and outside of the connector housing space part SA; and a restriction part 300 that is formed on the inner face of the third wall part 100*c* to restrict the communication between the connector housing space part SA and the routing space part SB in a state of being attached to the connector 10. Furthermore, as illustrated in FIG. 7, the first cover 110 includes recessed parts 42 that are formed on the inner faces of the first wall part 100*a* and the second wall part 100*b*, and are capable of housing respective positioning protruded parts 41 provided on the connector 10, when attached to the connector 10. Moreover, as illustrated in FIG. 7, the first cover 110 includes: a positioning rib 51 that is formed on the inner face of the first wall part 100*a* to abut against the end part of the tip side of the corrugated tube C in the axial direction X when attached to the connector 10; and recessed parts 52 that are formed on the first wall part 100*a* and the second wall part 100*b*, and are capable of housing one protruded part of the recessed and protruded parts Ca of the corrugated tube C.

In a state of being attached to the connector 10, the hole part 200 is positioned adjacent to the locking release part 31. More specifically, the hole part 200 is positioned on the base end side in the axial direction X of the portion of the third wall part 100*c* where the second space part SA2 of the connector housing space part SA is formed. Furthermore, in a state of being attached to the connector 10, the hole part 200 is formed from a position L2 overlapping with the locking release part 31 to a position L3 overlapping with the insertion port 13 in the extending direction (axial direction X) of the terminal T of the wiring material WT with terminal that is housed in the terminal housing part 12 of the connector 10, and it is positioned on the upper side (outer side) in the height direction Z of the locking release part 31 (see FIG. 6).

Figure 4:
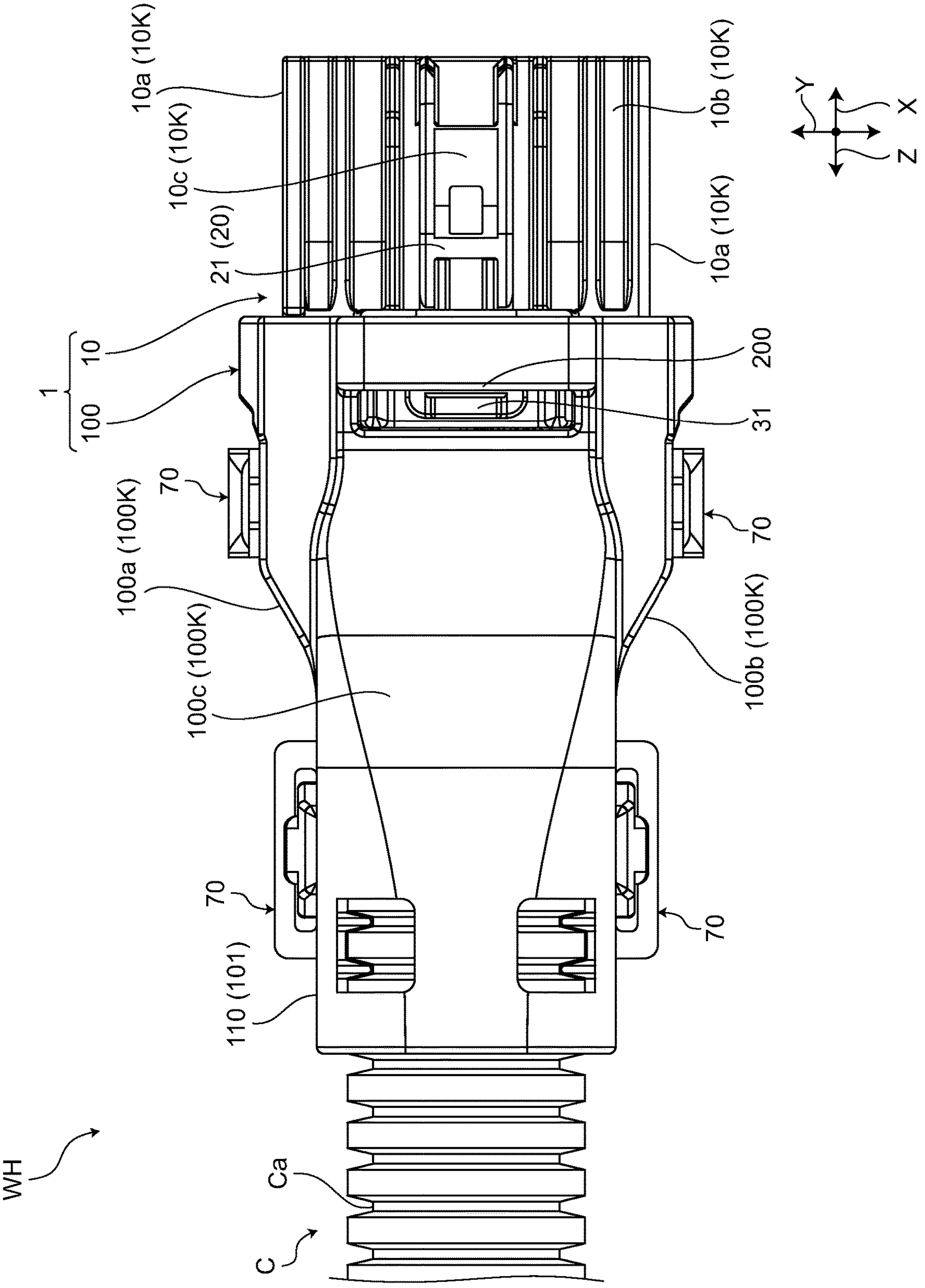
FIG. 4 is a partial top view of the wire harness including the connector assembly according to the embodiment.

The hole part 200 is also formed in a substantially straight line shape along the width direction Y (see FIG. 4). The size (also referred to shape) of the hole part 200 is not specifically limited, but is set to be in a size into which a finger of a worker or the like cannot be inserted.

The restriction part 300 is a wall part whose axial direction X is the thickness direction, which extends along the width direction Y and the height direction Z, and is positioned closer to the base end side than the hole part 200 is, in axial direction X. In a state of being attached to the connector 10, the restriction part 300 is disposed to block the space between the hole part 200 and the routing space part SB that is positioned closer to the base end side in the axial direction X than the connector housing space part SA where the hole part 200 is positioned is (see FIG. 6). More specifically, the restriction part 300 is disposed adjacent to the edge part of the hole part 200 on the insertion port 13 side in the axial direction X, which is positioned on the base end side in the axial direction X of the portion of the third wall part 100*c* where the second space part SA2 of the connector housing space part SA is formed (in other words, on the tip side in the axial direction X of the portion forming the routing space part SB). Furthermore, the restriction part 300 extends from the inner face of the portion forming the second space part SA2 to the outer face of the first wall part 10*a* positioned by opposing to the inner face with a space provided therebetween, and it is disposed at a position to block the second space part SA2 of the connector housing space part SA from the routing space part SB (see FIG. 6).

Figure 8:
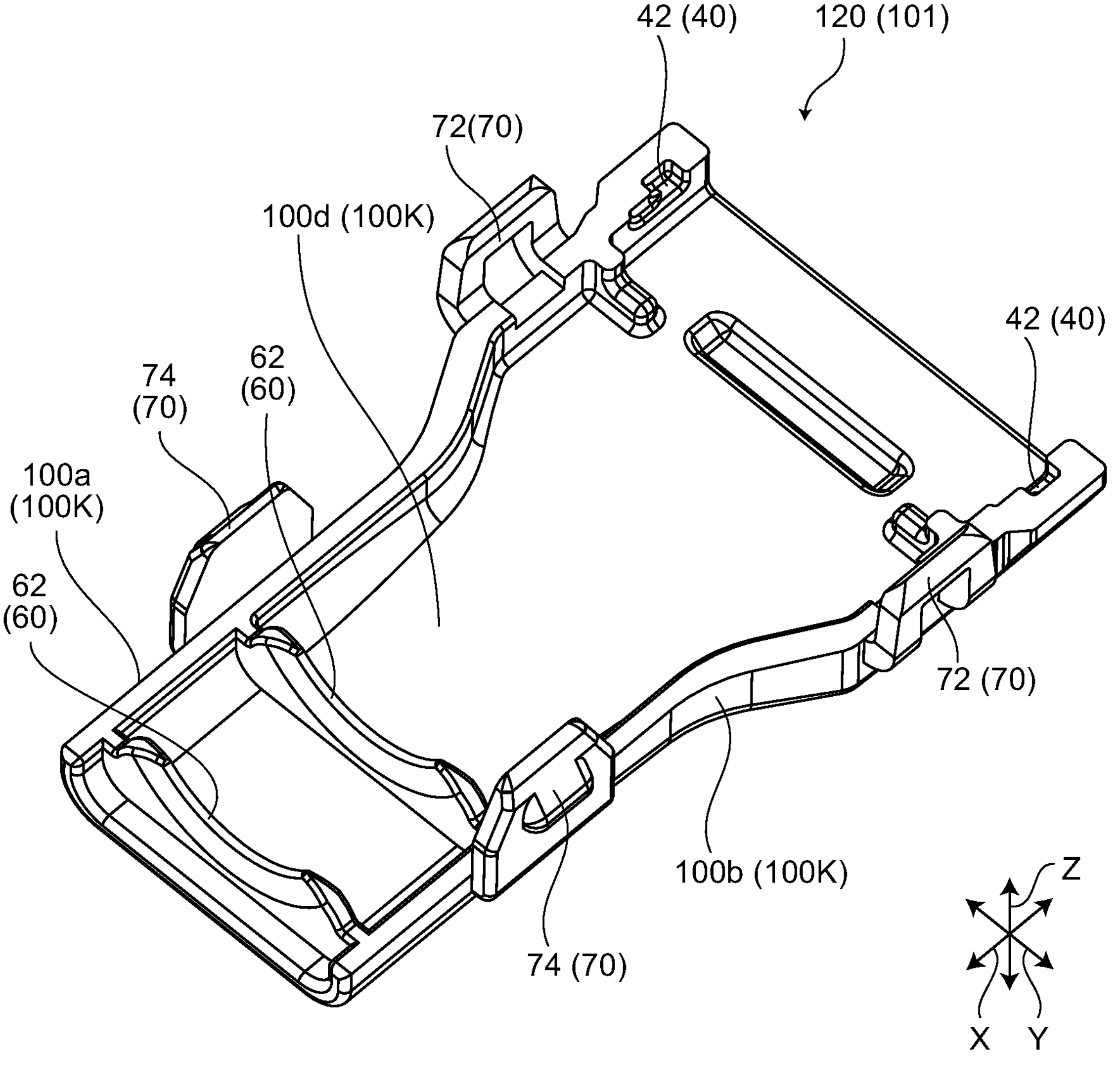
FIG. 8 is a perspective view of a second cover of the connector cover according to the embodiment.
Figure 9:
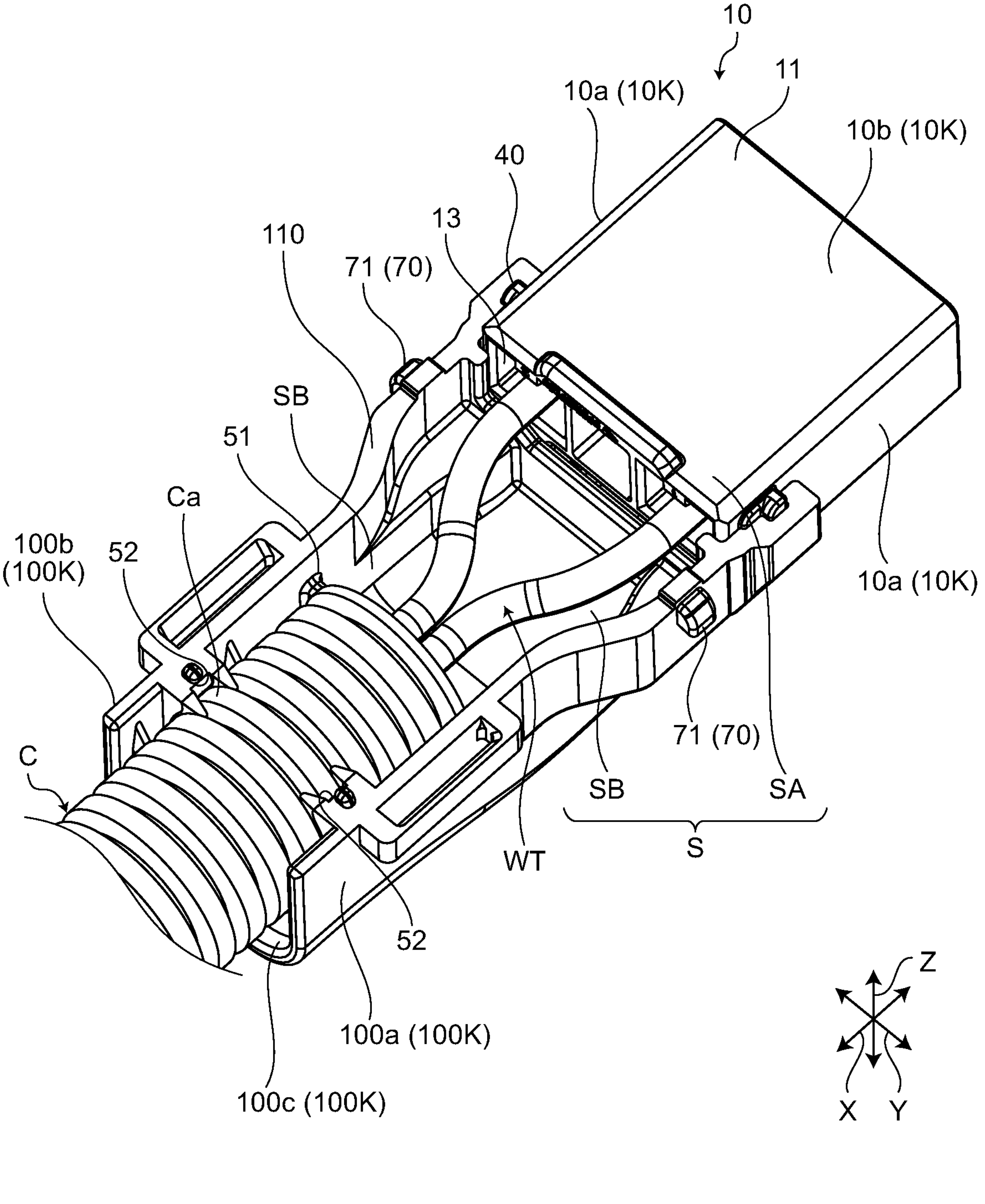
FIG. 9 is a perspective view illustrating a state where the connector according to the embodiment is housed in the first cover.

As illustrated in FIG. 7, the recessed parts 42 are formed extending in the width direction Y from the inner faces of the first wall part 100*a* and the second wall part 100*b*, and are positioned on the tip side of the main body part 101 in the axial direction X. The connector cover 100, when attached to the connector 10, houses and holds the housing 11 at a desired position L4 via a positioning mechanism 40 that is configured including the recessed parts 42. Note that the shape of the wall parts forming the recessed parts 42 is not specifically limited. For example, the recessed parts 42 may be configured including a pair of wall parts with the axial direction X being the thickness direction, while extending along the width direction Y and the height direction Z from the inner faces of the first wall part 100*a* and the second wall part 100*b*. Furthermore, the positions of the recessed parts 42 are not specifically limited. As illustrated in FIG. 8, the recessed parts 42 may be provided in the second cover 120, or may be provided in either one of the first cover 110 or the second cover 120.

The positioning mechanism 40 is configured including: the positioning protruded parts 41 (see FIG. 2) provided in the connector 10; and the recessed parts 42 provided in the first cover 110 and the second cover 120. The positioning protruded part 41 and the recessed part 42 are provided as a set on both sides of the width direction Y, respectively. As illustrated in FIG. 2, the positioning protruded parts 41 are positioned at the end parts on the base end side in the axial direction X of the pair of first wall parts 10*a*, and formed protruding outwardly from the outer faces of the first wall parts 10*a* in the width direction Y.

As illustrated in FIG. 7, the positioning rib 51 is a wall part with the axial direction X being the thickness direction, which is formed extending in the width direction Y from the inner face of the first wall part 100*a*, and positioned in the middle part of the main body part 101 in the axial direction X. The connector cover 100, when attached to the connector 10, houses and holds the tip part of the corrugated tube C at a desired position L5 via the positioning rib 51. Note that the position of the positioning rib 51 with respect to the main body part 101 is not specifically limited, as long as it is a position capable of housing the tip part of the corrugated tube C at the desired position L5. For example, it may be formed extending in the width direction Y from the inner face of the second wall part 100*b* of the first cover 110.

As illustrated in FIG. 7, the recessed parts 52 are configured including the pair of wall parts with the axial direction X being the thickness direction while extending along the width direction Y and the height direction Z from the inner faces of the first wall part 100*a* and the second wall part 100*b*, and it is positioned on the base end side of the main body part 101 in the axial direction X. Furthermore, the recessed parts 52 are provided as a set on both sides of the width direction Y, respectively. The connector cover 100, when attached to the connector 10, houses and holds one protruded part of the recessed and protruded parts Ca of the corrugated tube C at a desired position L6 via the recessed parts 52. The shapes and positions of the wall parts forming the recessed parts 52 with respect to the main body part 101 are not specifically limited, as long as it is a position capable of housing one protruded part of the recessed and protruded parts Ca of the corrugated tube C at the desired position L6.

Furthermore, as illustrated in FIG. 6 to FIG. 8, the first cover 110 and the second cover 120 have an engagement part 60 that engages with the recessed and protruded parts Ca of the corrugated tube C when mounted by sandwiching the connector 10 and the corrugated tube C.

The engagement part 60 is configured including: a plurality of first cover side engagement parts 61 provided in the first cover 110; and a plurality of second cover side engagement parts 62 provided in the second cover 120. Two each of the first cover side engagement parts 61 and the second cover side engagement parts 62 are provided with a space provided therebetween along the axial direction X. Each of the first cover side engagement parts 61 is formed on the inner face of the third wall part 100*c*, that is, on the inner wall face facing the routing space part SB, and engages with the recessed and protruded parts Ca of the corrugated tube C on the first cover 110 side. On the other hand, each of the second cover side engagement parts 62 is formed on the inner face of the fourth wall part 100*d*, that is, the inner wall face facing the routing space part SB, and engages with the recessed and protruded parts Ca of the corrugated tube C on the second cover 120 side. In more detail, each of the engagement parts 60 is configured including a part that is formed on the inner face of each of the wall parts 100K by being curved to fit the shape of the outer peripheral face of the corrugated tube C along the width direction Y. Furthermore, each of the engagement parts 60 is formed in a tapered shape from the protrusion base end side of the engagement part 60 on the wall part 100K side toward the protrusion tip side on the routing space part SB side.

Furthermore, as illustrated in FIG. 1 to FIG. 5, the first cover 110 and the second cover 120 fit each other via a locking mechanism 70 with the opening parts respectively formed by the first wall part 100*a* and the second wall part 100*b* abutting against each other, when mounted by sandwiching the connector 10 and the corrugated tube C.

The locking mechanism 70 is configured including: a plurality of locking protruded parts 71 provided on the first cover 110; locked hole parts 72 provided on the second cover 120 correspondingly to each of the locking protruded parts 71; a plurality of locked hole parts 73 provided on the first cover 110; and locking protruded parts 74 provided on the second cover 120 correspondingly to each of the locked hole parts 73.

The locking protruded parts 71 and the locked hole parts 72 are positioned at the end parts on the tip side in the axial direction X of the first wall part 100*a* and the second wall part 100*b* configuring the first cover 110 and the second cover 120, and are provided as a set on both sides of the width direction Y, respectively. Furthermore, the locked hole parts 73 and the locking protruded parts 74 are positioned at the end parts on the base end side in the axial direction X of the first wall part 100*a* and the second wall part 100*b*, and are provided as a set on both sides of the width direction Y, respectively.

Next, an operation when assembling the wire harness WH will be described by referring to FIG. 8 and the like.

First, an operator prepares the wiring material WT with terminal with the wiring materials W inserted inside the corrugated tube C. The operator then houses each of the terminals T of the wiring material WT with terminal in each of the terminal housing parts 12 formed in the housing 11 of the connector 10. At this time, each of the terminals T is inserted from the insertion port 13 of the terminal housing part 12.

Then, as illustrated in FIG. 8, the operator mounts the base end part of the housing 11 of the connector 10 and the tip part of the corrugated tube C with the wiring materials W inserted therein onto the first cover 110 of the connector cover 100. Specifically, the operator mounts the housing 11 to the first cover 110 at the desired position L4 via the positioning mechanism 40, and houses the base end part of the housing 11 in the connector housing space part SA of the first cover 110. The operator also mounts the corrugated tube C to the first cover 110 at the desired position L5 via the positioning rib 51, and houses the tip part of the corrugated tube C in the routing space part SB. As a result, the end part on the insertion port 13 side of the terminal housing part 12 where the live part WE is housed and the part, which is not protected by the corrugated tube C, of the wiring material W connected to the live part WE are housed in the internal space S of the first cover 110. Furthermore, recessed and protruded parts Ca of the corrugated tube C on one side are housed and held in the first cover 110 at the desired position L6 via the recessed parts 52. In addition, recessed and protruded parts Ca on the other side, which are positioned closer to the base end side than the recessed and protruded part Ca held by the recessed parts 52 is, are held in the first cover 110 via the first cover side engagement parts 61. As described, the positions of the connector 10 and the corrugated tube C with respect to the connector cover 100 are determined by the positioning mechanism 40, the positioning rib 51, the recessed parts 52, and the like, so that assembling work of the connector cover 100 can be easily performed.

Figure 5:
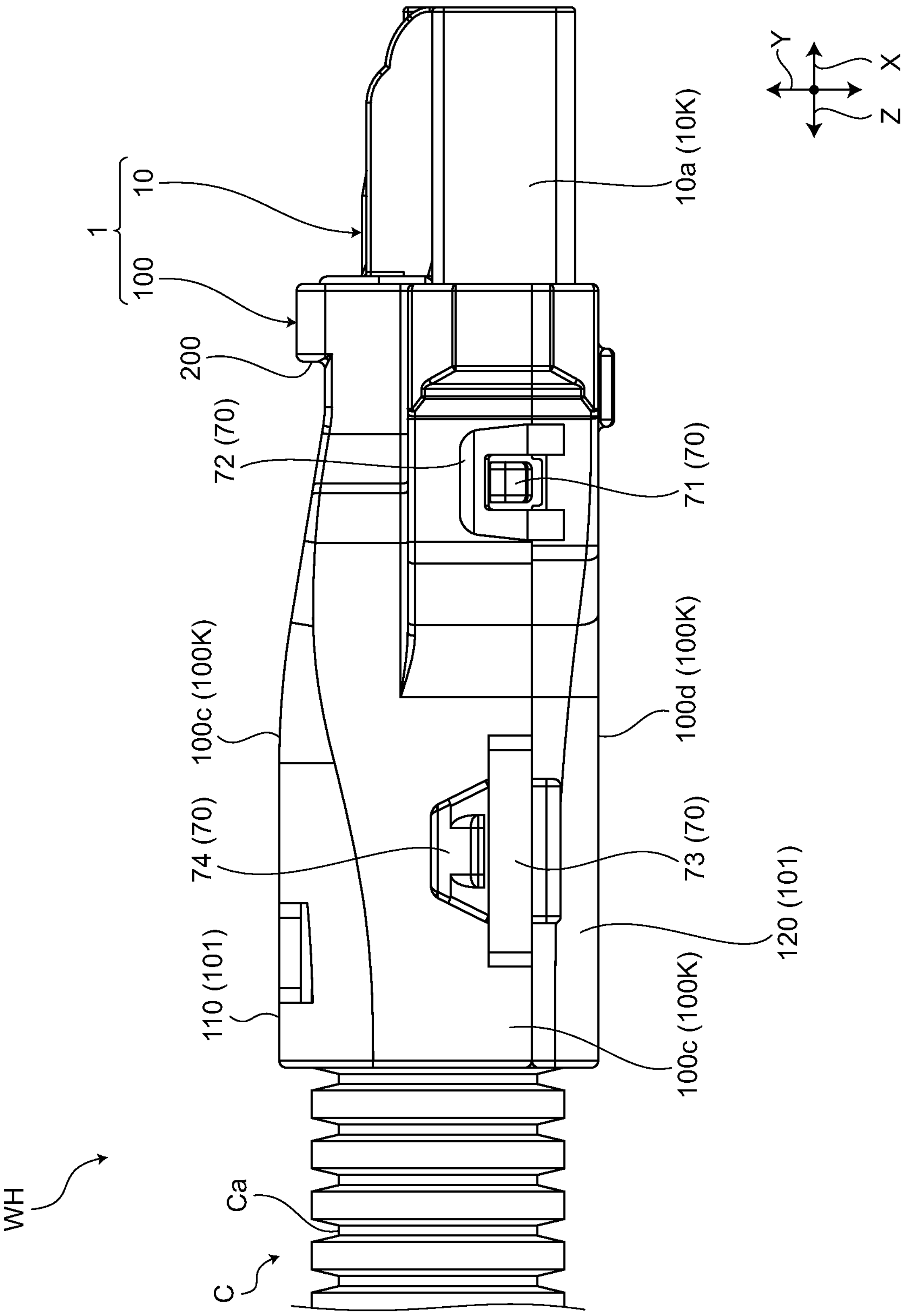
FIG. 5 is a partial side view of the wire harness including the connector assembly according to the embodiment.

Then, as illustrated in FIG. 4, FIG. 5, and the like, the operator mounts the second cover 120 to the first cover 110 to which the connector 10 is mounted. Specifically, the operator fits the first cover 110 and the second cover 120 together via the locking mechanism 70. Since the first cover 110 and the second cover 120 of the present embodiment have the locking protruded parts and the locked hole parts, respectively, the fitting force generated when the second cover 120 is mounted to the first cover 110 is increased when fitted to each other. Therefore, the connector cover 100 is configured such that the locked state between the first cover 110 and the second cover 120 is not easily released.

Then, as illustrated in FIG. 1, FIG. 2, and the like, the operator fits the tip part of the connector 10, which is not protected by the connector cover 100, into the housing space part from an insertion hole PL of the mating connector P.

Specifically, the operator locks the mating connector P to the connector 10 at the locking position L1 via the locking mechanism 20, and electrically connects the terminal T on the connector 10 side to the terminal PT on the mating connector P side while maintaining the locked state between the connector 10 and the mating connector P. At this time, the locking part 21 is housed in the internal space of the housing space part of the mating connector P, and the locking release part 31 capable of releasing the locked state between the connector 10 and the mating connector P is housed in the second space part SA2 that is the internal space S of the connector cover 100. Therefore, the connection part (live part WE) and the like of the connector 10 protected by the connector cover 100 is configured so as not to be easily accessed from the outside, and configured such that the connection state between the connector 10 and the mating connector P is not easily released.

Then, as necessary, the operator inserts tools for releasing the connection state between the connector 10 and the mating connector P into the connector cover 100 from the hole part 200 that is provided in the connector cover 100. Such tools, when inserted into the internal space S of the connector cover 100 from the hole part 200, can access the locking release part 31 positioned adjacent to the hole part 200, and release the locked state between the connector 10 and the mating connector P using the locking mechanism 20 by elastically deforming the arm part 10*c* where the locking part 21 is provided toward the locking release direction (downward and inward in the height direction Z).

The connector assembly 1 applied to the wire harness WH described above includes: the connector 10 including the housing 11 that has the terminal housing part 12 for housing the terminal T provided at the end part of the wiring material W exhibiting conductivity, the insertion port 13 through which the wiring material W is inserted, the locking part 21 that is formed on an outer face (outer face of the wall part 10K) of the terminal housing part 12 and capable of locking the mating connector P as the connection mating member, and the locking release part 31 that is formed on the outer face side of the wall part 10K and capable of releasing the locking relation with the mating connector P; and the connector cover 100 attached to the connector 10. Furthermore, the connector cover 100 includes: the wall part 100K that forms the connector housing space part SA for housing the end part of the connector 10 on the insertion port 13 side and the locking release part 31 and forms the routing space part SB which is positioned adjacent to the connector housing space part SA and in which the wiring material W is routed; the hole part 200 that is formed in the wall part 100K, positioned adjacent to the locking release part 31, and communicates inside and outside of the connector housing space part SA in a state of being attached to the connector 10; and the restriction part 300 that is formed in the wall part 100K and blocks the hole part 200 from the routing space part SB in a state of being attached to the connector 10.

In general, a connector cover attached to a connector is capable of protecting the rear end part (base end part) of the connector, which is disposed protruding from the mating connector, and capable of protecting the live part. However, when a hole part accessible from the outside to the part that needs to be operated for releasing connection between the connectors is provided in the connector cover, it is concerned that a tool for releasing the connection between the connectors and a probe or the like for measuring the electric characteristic or the like may enter from the hole part depending on the shape or the size of the hole part and that the protection performance of the connector cover for the connector may be deteriorated. For this reason, the connector cover 100 according to the present embodiment has the restriction part 300 disposed at the position to block the routing space part SB from the connector housing space part SA (second internal space SA2) that communicates with the hole part 200, in a state of being attached to the connector 10. With such a configuration, the hole part 200 can function as a mechanism to assist work performed on the connector using a tools or the like, thereby making it possible to improve the work efficiency. Furthermore, the restriction part 300 can function as a mechanism for preventing the protection performance of the connector cover 100 for the connector 10 from being deteriorated by a tool or the like entering the routing space part SB from the hole part 200, by being interposed between the hole part 200 and the routing space part SB. Therefore, the connector assembly 1 can ensure the proper protection performance for the connector 10 and the wiring material WT with terminal.

More specifically, the connector housing space part SA of the connector cover 100 described above includes the first space part SA1 where the end part of the connector 10 on the insertion port 13 side is housed, and the second space part SA2 where the locking release part 31 is housed. Furthermore, the hole part 200 of the connector cover 100 is formed in the wall part 100K that forms the second space part SA2 and communicates with the second space part SA2. The hole part 200 is formed from the position L2 that overlaps with the locking release part 31 to the position L3 that overlaps with the insertion port 13 in the extending direction (axial direction X) of the terminal T housed in the terminal housing part 12 in a state where the connector cover 100 is attached to the connector 10. Furthermore, the restriction part 300 of the connector cover 100 is disposed adjacent to the edge part of the hole part 200 on the insertion port 13 side in the axial direction X. The restriction part 300 is formed protruding from the inner face of the portion of the wall part 100K where the routing space part SB and the second space part SA2 are formed toward the outer face (outer face of the wall part 10K) in a state where the connector cover 100 is attached to the connector 10, with the tip side extending to the outer face, and disposed at the position to block the second space part SA2 from the routing space part SB.

With such a configuration, the restriction part 300 is configured with the wall part extending from the inner face of the third wall part 100*c* of the connector cover 100 to the connector 10 side. Therefore, the restriction part 300 is interposed between the second inner space SA2 and the routing space part SB to function as the mechanism for preventing the protection performance of the connector cover 100 for the connector 10 from being deteriorated by a tool or the like entering the routing space part SB from the second internal space SA2 communicating with the hole part 200. Therefore, the connector assembly 1 can ensure the proper protection performance for the connector 10 and the wiring material WT with terminal.

Furthermore, the size of the hole part 200 in the connector cover 100 described above is set to be in a size into which a finger cannot be inserted. With such a configuration, the connector cover 100 is configured such that fingers larger than a tool or the like cannot access the locking release part 31 positioned adjacent to the hole part 200, thereby making it possible to prevent the connection state between the connector 10 and the mating connector P from being released by unintentional insertion or the like of fingers. Therefore, the connector assembly 1 can ensure the proper protection performance for the connector 10 and the wiring material WT with terminal.

Furthermore, the connector 10 described above has at least one positioning protruded part 41 formed on the outer face (the wall part 10K) of the housing 11, and the connector cover 100 has the recessed parts 42 which are formed on the inner face of the wall part (100K) and capable of housing the respective positioning protruded parts 41 when attached to the connector 10. With such a configuration, the connector 10 is mounted at the desired position L4 since the positioning protruded parts 41 are housed in the recessed parts 42 and the positioning in the axial direction X with respect to the connector cover 100 is determined when the connector cover 100 is attached. Therefore, when connected to the mating connector P, the part of the connector 10 positioned outside of the mating connector P can be properly protected by the connector cover 100. Therefore, the connector assembly 1 can ensure the proper protection performance for the connector 10 and the wiring material WT with terminal. Furthermore, the connector assembly 1 is positioned by the positioning protruded parts 41 and the recessed parts 42, thereby making it possible to easily perform assembling work.

Furthermore, the connector cover 100 described above is configured including the first cover 110 and the second cover 120, which are mounted by sandwiching the end part of the connector 10 on the insertion port 13 side and the end part of the corrugated tube C that houses the wiring material W extending from the insertion port 13. With such a configuration, it is possible to improve the work efficiency when mounting the connector 10 and the corrugated tubing C to the connector cover 100. Furthermore, by mounting the connector 10 and the corrugated tube C to one of the covers and then fitting the opening parts of the first cover 110 and the second cover 120 with each other to be mounted onto each other, the connector assembly 1 can ensure the proper protection performance for the connector 10 and the wiring material WT with terminal.

Note that the connector assembly 1, the wire harness WH, and the connector cover 100 according to the embodiment of the present invention described above are not limited to the embodiment described above, and various changes are possible within the scope of the appended claims.

For example, the position of the hole part formed in the connector cover (access hole for the locking release part) is not limited as long as the hole part is positioned closer to the tip side than the routing space part is, in the axial direction, and makes it possible to access the locking release part. Furthermore, the position of the restriction part formed in the connector cover is not limited, as long as the restriction part is positioned closer to the tip side than the routing space part is, in the axial direction, and is positioned closer to the base end side than the hole part is, in the axial direction. Moreover, the form of the restriction part is not limited, as long as the restriction part has a size (shape) such that the toll or the like inserted from the hole part does not go through the restriction part and enter the routing space part side.

Furthermore, the hole part formed in the connector cover is not limited to the shape illustrated in the drawings.

Moreover, the first cover and the second cover may be members formed integrally. The form of the main body part of the connector cover is not limited, as long as the main body part is a member that can be attached to the connector.

Furthermore, the connector assembly 1, the wire harness WH, and the connector cover 100 according to the present embodiment may be configured by combining the structural components of the embodiment described above as appropriate.

The connector assembly, the wire harness, and the connector cover according to the present embodiment can ensure the proper protection performance.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A connector assembly comprising:

a connector including a housing that includes a terminal housing part for housing a terminal provided at an end part of a wiring material exhibiting conductivity, an insertion port where the wiring material is inserted, a locking part formed on an outer face side of the terminal housing part and capable of locking a connection mating member, and a locking release part formed on the outer face side and capable of releasing a locking relation with the connection mating member; and a connector cover attached to the connector, wherein the connector cover includes a wall part that forms a connector housing space part for housing an end part of the connector on the insertion port side and the locking release part, and a routing space part where the wiring material is routed, the routing space part being positioned adjacent to the connector housing space part, a hole part formed in the wall part, the hole part being positioned with a perimeter of the hole part enclosing the locking release part and communicating inside and outside of the connector housing space part in a state of being attached to the connector, and a restriction part formed in the wall part and blocks the hole part from the routing space part in a state of being attached to the connector.

2. The connector assembly according to claim 1, wherein the connector cover includes a first cover and a second cover mounted by sandwiching the end part of the connector on the insertion port side and an end part of a corrugated tube that houses the wiring material extending from the insertion port.

3. The connector assembly according to claim 1, wherein the connector includes at least one positioning protruded part formed on an outer face of the housing, and the connector cover includes recessed parts that are formed on an inner face of the wall part and capable of housing each of the positioning protruded parts when attached to the connector.

4. The connector assembly according to claim 3, wherein the connector cover includes a first cover and a second cover mounted by sandwiching the end part of the connector on the insertion port side and an end part of a corrugated tube that houses the wiring material extending from the insertion port.

5. The connector assembly according to claim 1, wherein the hole part is set to be in a size into which a finger is unable to be inserted.

6. The connector assembly according to claim 3, wherein the connector cover includes a first cover and a second cover mounted by sandwiching the end part of the connector on the insertion port side and an end part of a corrugated tube that houses the wiring material extending from the insertion port.

7. The connector assembly according to claim 5, wherein the connector includes at least one positioning protruded part formed on an outer face of the housing, and the connector cover includes recessed parts that are formed on an inner face of the wall part and capable of housing each of the positioning protruded parts when attached to the connector.

8. The connector assembly according to claim 7, wherein the connector cover includes a first cover and a second cover mounted by sandwiching the end part of the connector on the insertion port side and an end part of a corrugated tube that houses the wiring material extending from the insertion port.

9. The connector assembly according to claim 1, wherein the connector housing space part includes a first space part where the end part of the connector on the insertion port side is housed, and a second space part where the locking release part is housed, the hole part is formed in the wall part that forms the second space part and communicates with the second space part, and is formed from a position overlapping with the locking release part to a position overlapping with the insertion port in an extending direction of the terminal housed in the terminal housing part in a state where the connector cover is attached to the connector, and the restriction part is disposed adjacent to an edge part of the hole part on the insertion port side in the extending direction, is formed protruding from an inner face of a portion of the wall part where the routing space part and the second space part are formed toward an outer face in the state where the connector cover is attached to the connector, with a tip side extending to the outer face, and is disposed at a position to block the second space part from the routing space part.

10. The connector assembly according to claim 9, wherein the connector cover includes a first cover and a second cover mounted by sandwiching the end part of the connector on the insertion port side and an end part of a corrugated tube that houses the wiring material extending from the insertion port.

11. The connector assembly according to claim 9, wherein the connector includes at least one positioning protruded part formed on an outer face of the housing, and the connector cover includes recessed parts that are formed on an inner face of the wall part and capable of housing each of the positioning protruded parts when attached to the connector.

12. The connector assembly according to claim 11, wherein the connector cover includes a first cover and a second cover mounted by sandwiching the end part of the connector on the insertion port side and an end part of a corrugated tube that houses the wiring material extending from the insertion port.

13. The connector assembly according to claim 9, wherein the hole part is set to be in a size into which a finger is unable to be inserted.

14. The connector assembly according to claim 13, wherein the connector cover includes a first cover and a second cover mounted by sandwiching the end part of the connector on the insertion port side and an end part of a corrugated tube that houses the wiring material extending from the insertion port.

15. The connector assembly according to claim 13, wherein the connector includes at least one positioning protruded part formed on an outer face of the housing, and the connector cover includes recessed parts that are formed on an inner face of the wall part and capable of housing each of the positioning protruded parts when attached to the connector.

16. The connector assembly according to claim 15, wherein the connector cover includes a first cover and a second cover mounted by sandwiching the end part of the connector on the insertion port side and an end part of a corrugated tube that houses the wiring material extending from the insertion port.

17. A wire harness comprising:

a wiring material with terminal including a wiring material exhibiting conductivity and a terminal provided at an end part of the wiring material;

a connector including a housing that includes a terminal housing part for housing the terminal, an insertion port where the wiring material is inserted, a locking part formed on an outer face side of the terminal housing part and capable of locking a connection mating member, and a locking release part formed on the outer face side and capable of releasing a locking relation with the connection mating member; and a connector cover attached to the connector, wherein the connector cover includes a wall part that forms a connector housing space part for housing an end part of the connector on the insertion port side and the locking release part, and a routing space part where the wiring material is routed, the routing space part being positioned adjacent to the connector housing space part, a hole part formed in the wall part, the hole part being positioned with a perimeter of the hole part enclosing the locking release part and communicating inside and outside of the connector housing space part in a state of being attached to the connector, and a restriction part formed in the wall part and blocks the hole part from the routing space part in a state of being attached to the connector.

18. A connector cover comprising:

a wall part that forms a connector housing space part configured to house an end part of a connector on an insertion port side and a locking release part of the connector, and a routing space part configured to house a wiring material of the connector, the routing space part being positioned adjacent to the connector housing space part;

a hole part formed in the wall part; and a restriction part formed in the wall part, wherein, in a state of being attached to the connector including a housing that includes a terminal housing part for housing a terminal provided at an end part of the wiring material exhibiting conductivity, the insertion port where the wiring material is inserted, a locking part formed on an outer face side of the terminal housing part and capable of locking a connection mating member, and the locking release part formed on the outer face side and capable of releasing a locking relation with the connection mating member, the hole part is positioned with a perimeter of the hole part enclosing the locking release part and communicates inside and outside of the connector housing space part, and the restriction part blocks the hole part from the routing space part.

* * * * *